United States Patent [19]

Swinton

[11] Patent Number: 5,405,416
[45] Date of Patent: Apr. 11, 1995

[54] MARINE DYE COMPOSITION

[75] Inventor: Robert J. Swinton, Ascot Vale, Australia

[73] Assignee: Commonwealth of Australia, Canberra, Australia

[21] Appl. No.: 58,372

[22] Filed: May 10, 1993

Related U.S. Application Data

[63] Continuation-in-part of Ser. No. 752,610, Oct. 10, 1991, abandoned.

[30] Foreign Application Priority Data

Feb. 23, 1989 [AU] Australia ................. PJ2905

[51] Int. Cl.6 ................. C09B 69/08; G08B 5/00
[52] U.S. Cl. ........................... 8/636; 8/526; 8/552; 8/560; 8/611; 8/658; 116/211; 116/26
[58] Field of Search .............. 8/524, 526, 560, 552, 8/611; 116/211, 26, DIG. 9

[56] References Cited

U.S. PATENT DOCUMENTS

| | | | |
|---|---|---|---|
| 2,716,961 | 9/1955 | Manheim | 116/211 |
| 3,048,464 | 8/1962 | Fisher | 116/211 |
| 3,263,012 | 9/1963 | Nadler et al. | 116/211 |
| 3,297,585 | 1/1967 | Hayden | 116/211 |
| 3,909,444 | 9/1975 | Anderson et al. | 252/316 |
| 4,016,133 | 4/1977 | Hyosu et al. | 260/42.21 |
| 5,196,030 | 3/1993 | Akerblom et al. | 8/552 |

OTHER PUBLICATIONS

"UCAR Phenolic Microballons," Union Carbide Corporation, 1982, all pages, no month available.
"Expancel," Feb. 27, 1985, all pages.

Primary Examiner—Paul Lieberman
Assistant Examiner—Caroline L. Dusheck
Attorney, Agent, or Firm—Finnegan, Henderson, Farabow, Garrett & Dunner

[57] ABSTRACT

A marine dye composition comprising a water soluble or dispersible dye, particles of a density controlling material having a bulk density and being present in an amount so as to cause said composition to have a relative density of about 1 and to be capable of floating at the surface of a body of water and a water soluble or dispersible binding agent for binding the dye and particles of density controlling material together.

9 Claims, No Drawings

MARINE DYE COMPOSITION

This application is a continuation-in-part of application Ser. No. 07/752,610 filed on 10th Oct. 1991, now abandoned.

BACKGROUND OF THE INVENTION

The present invention relates to marine dye compositions. Marine dye compositions have been used in a number of applications to mark the location of crashed aircraft, life rafts and military equipment, for example rockets.

Life preservers used in aircraft in particular have been provided with a fluorescein dye placed in a cotton bag. The bag was sufficiently porous to allow water to seep through and dissolve the fluorescein dye. The disadvantages associated with using this system are as follows:

1. The bag could be easily ripped and the dye lost prematurely.
2. Once sufficient water had been absorbed by the bag and it became detached, it could float below the surface of the water.
3. The dye often caked due to moisture being absorbed by the bag from the air. Furthermore the rate of diffusion of the dye through the cotton bag could not be controlled.

The specification of U.S. Pat. No. 3,263,012 discloses a composition which purports to overcome these problems. The composition disclosed comprises a fluorescein compound bound in a matrix of polyvinyl alcohol resin containing glycerine and borax. The composition is pressed into a cake and made into a relatively thin plate like object. The principal object of the invention disclosed in this U.S. patent is to supply a composition that provides a controlled release of dye into water over an extended period of time, for example up to 45 days. The purpose of the glycerine is said to be to swell the polyvinyl alcohol resin and to dissolve the dye thereby permitting the dye to diffuse into the resin and to be encapsulated in the resin matrix. In addition, the specification states that the glycerine partially controls the rate of diffusion of the dye from the polyvinyl alcohol matrix into the water when the device is ejected into the sea. The more glycerine the greater the rate of emission of dye into the water. The presence of borax appears to be for the purpose of maintaining the cohesive strength of the resin matrix.

SUMMARY OF THE INVENTION

As distinct from the objects of earlier inventions the Royal Australian Navy identified the need for a marine dye composition which could be used to locate a submarine launched pyrotechnic signal (SLMPS). The dye needed to be observable for approximately thirty minutes thereby aiding in the recovery of any message carried by the signal or to locate the submarine that fired the signal. Previously, such signals were provided with a flare that had a duration of seventy-five seconds to two minutes.

An object of the present invention is to provide a composition that is capable of releasing dye on the surface of water for a period up to thirty minutes.

Accordingly the present invention provides a marine dye composition comprising a water soluble or dispersible dye, particles of a density controlling material having a bulk density and being present in an amount so as to cause said composition to have a relative density of about 1 and to be capable of floating at the surface of a body of water and a water soluble or dispersible binding agent for binding the dye and particles of density controlling material together.

Suitable dyes include Fluorescein LT marketed by ICI Australia. It is described in the colour index as CI acid yellow 73 Constitution No. 5350 and is essentially the sodium salt of hydroxy-ortho-carboxy-phenyl fluorene and is of the formula

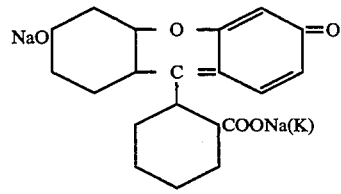

Fluorescein is visible at concentrations in water above 25 p.p.m.. Below this it appears to be colourless. It is especially preferred that the dye comprises from 90 and 98 percent by weight of the composition.

Another suitable dye composition is know as "Seamarker Dye Composition" and consists of a mixture of three dye CI acids; Red 51, of the formula

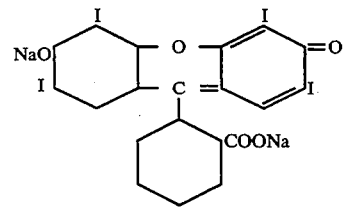

Red 50 of the formula

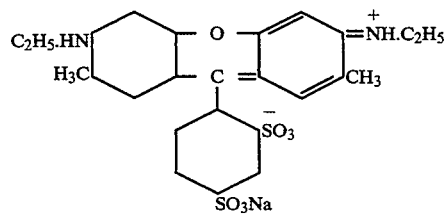

and Yellow 73. The predominantly red colouration of this marker comes from the sodium salt of rhodamine disulphonic acid. The sodium salt of fluorescein may also be used.

Suitable density controlling materials include any materials that introduce permanent air pockets into the composition. This may be achieved with microballoons of a plastics material such as polyethylene or phenol formaldehyde. Microballoons having a bulk density of approximately 0.01 g/cc are preferred. Microballoons made from polyvinylidene chloride (PVDC) are particularly preferred.

Preferred binding agents include water soluble derivatives of cellulose such as sodium carboxy methyl cellulose. Grades of sodium carboxy methyl cellulose are available with varying degrees of solubility. This is regulated by the degree of substitution of the polar groups by carboxy methyl groups. The rate at which the dye dissolves in sea water can therefore be determined by selecting an appropriate grade of sodium carboxy methyl cellulose.

Polyvinyl alcohol may also be used as a binder. However, polyvinyl alcohol is not a preferred binder because it was found to be rather messy and time consuming to use.

DETAILED DESCRIPTION OF THE INVENTION

The relative density of the compositions of the present invention can be adjusted such that it is about 1. Such compositions float at the surface and maximise the aerial visibility of dye dissolved from the composition. Compositions that rapidly provide a patch of dissolved dye on the water surface can also be produced. This can be particularly useful when trying to attract the attention of aircraft especially from a life raft. Dye spots can be produced within 1 minute that are visible from a distance of up to 5 km.

The composition of the present invention may be packaged and displayed in a variety of ways depending on the proposed use. Small granules or pellets may be inserted into a vial for attachment to a life jacket. For use as an aerial marker the composition may be formed into larger pellets and packed in bags or containers made of a water soluble material such as polyvinyl alcohol. Bags made from a film of polyvinyl alcohol have been found to be particularly useful. The composition may be packed into the bag and the bag entrance heat sealed to store the composition for use.

Preferred embodiments of the invention will now be described by reference to the accompanying examples.

EXAMPLE 1

| | |
|---|---|
| Fluorescein LT (ICI Brand) B.S.S. 100 | 92 parts |
| Polyvinylidene chloride (EXPANCEL BRAND) | 1.8 parts |
| Sodium Carboxy Methyl Cellulose (DIACEL 1130) | 1.3 parts |
| Glycerol | 4.6 parts |

The Fluorescein LT is dried in an oven at 100° C. for twenty-four hours. It is then sieved using a B.S.S. 100 sieve. The sodium carboxy methyl cellulose is dissolved in water to a concentration of 3 g per 100 ml. The glycerol is added to the solution whilst continuing to stir for a further five minutes. The fluorescein is mixed with the microballoons and the solution of sodium carboxy methyl cellulose and glycerine in water is added to the mixture to form a composition having a paste having a thick consistency. The mixture is poured onto a plastic sheet to a thickness of approximately 3 mm and dried in an oven at 40° C. for 72 hours and finally 100° C. for a further 24 hours. The composition is then removed from the oven and the resultant dried biscuit is broken into flakes of approximately 10 mm² by flexing the plastic sheet or snapping the flakes off the biscuit with an appropriate tool.

By experimentation it has been discovered that the composition is considerably more effective when formed into flakes in this way rather than extruded and cut into pellets.

EXAMPLE 2

| Flake Mixture | |
|---|---|
| Fluorescein LT (ICI Brand) sieved BSS 100 | 97.7 parts |
| Polyvinylidene chloride | 1.5 parts |
| Sodium Carboxyl Methyl Cellulose (DIACEL 1130) | 0.8 parts |

Procedure

The SCMC sample is first pre-wetted with ethanol then dissolved in water, stirring whilst heating. When fully dissolved the mixture takes on a viscous "clag-like" appearance and is added while still warm to the dye and microballoon admix and thoroughly blended into a runny paste.

The mixture is then poured onto non-stick trays to a thickness of approximately 3–5 mm and dried at 40° C. for 72 hours. The semi-dried cake is inverted to allow proper drying of the reverse side (approximately 48 hours). The cake is then broken into smaller, more manageable sizes and dried at 105° C.±5° C. to remove residual moisture (approximately 48 hours). Once dried the cakes can be broken into the required size (approximately 1 cm square) and stored in a desiccator until needed.

EXAMPLE 3

Preliminary tests were conducted off-shore with the aim of evaluating various dye packages for the size and duration of the mark produced. The following fluorescein configurations were tested.

(i) 7×10 g pellets, density 1.68 g cm$^{-3}$
(ii) 7×10 g pellets, density 1.57 g cm$^{-3}$
(iii) 7×10 g pellets, density 1.54 g cm$^{-3}$
(iv) 32 g loose filled, paper sealed
(v) buoyant flakes* 80 g net weight
(vi) buoyant foam pellets* 50 g net weight
(vii) sieved (BSS 100) 32 g loose packed

*Configuration (v) used fluorescein in combination with phenolic microballoons with polyvinyl acetate (PVA) as a binder and (vi) used an open-cell foam pellet into which the dye had been secreted.

Observations were made of the size of the dye mark produced and its duration. The conditions were overcast with 12–15 knot gusting winds and intermittent showers. The sea was relatively calm at the trial site with a sea-state between 1 and 2.

By far the most effective configuration was found to be the buoyant flakes (v). A large area was marked in a very short space of time and the maximum efficiency of the fluorescent properties of the dye emerged because the spot was near the surface.

Variation of density in the pressed pellets had only a small effect on the signals produced. All gave a serviceable though "streaky" signal which after 15 minutes was approximately 0.5 m wide by 15 m long.

The buoyant pellet configuration (vi) performed rather poorly with the dye leaching out far too slowly and the wind and wave action carrying the pellet far away from the original launch site.

The loose filled powder configuration (iv) gave a good initial signal however much of the spot drifted on the surface and was lost with the wind and the tide. In addition the larger grains sank.

The sieved BSS 100 sample (vii) also gave a good initial signal but the grains could be seen to sink to the seabed.

The following examples illustrate the invention but the formulations are less preferred than the foregoing formulations.

EXAMPLE 4

| | |
|---|---|
| Fluorescein | 80 g |
| Phenolic microballoons by Union Carbide | 10 g |
| Super saturated solution of polyvinyl alcohol | 40 g |

The components were mixed and poured into pyrex dishes to dry. The mixture was dried in an oven at 40° C. for 48 hours. The dried mixture was chipped out of the dish to yield 90 g of product.

EXAMPLE 5

| Formulation | |
|---|---|
| Fluorescein | 50 g |
| Polyvinyl alcohol powder | 30 g |
| Phenolic microballoons (ICI brand) | 20 g |
| Water | 250 ml |

The mixture was stirred at 45° C. until it became runny. Thereafter the mixture was dried at 71° C. for 24 hours in a flat bottomed non-stick tray. Unfortunately, not all of the polyvinyl alcohol dissolved so it remained as white lumps in the flakes of product. The mixture stuck to the tray and was very difficult to get out.

EXAMPLE 6

| Formulation | |
|---|---|
| Sorbitan Monopalmitate | 40 g |
| Fluorescein | 40 g |

Alumino-silicate in the form of fly ash 10 g from Pozzolanic of South Wentworthville, New South Wales. The sorbitan monopalmitate and the fluorescein were dissolved in 250 ml of water. The fly ash was then dissolved in the solution and the solution dried to yield the product.

EXAMPLE 7

| Formulation | |
|---|---|
| Fluorescein | 100 g |
| Diacel 1130 (ICI) at a concentration of 1 g per 100 ml | 200 ml |
| Alumino-silicate in the form of fly ash | 10 g |

Diacel 1130 and fluorescein were mixed with 40 mls of water to form a solution and the fly ash was mixed with the solution and the resultant mixture dried to yield the product.

EXAMPLE 8

| Formulation | |
|---|---|
| Fluorescein | 100 g |
| Diacel 1130 at a concentration of 1 g per 100 ml | 200 ml |
| Alumino-silicate in the form of fly ash | 20 g |

The fluorescein and Diacel 1130 were dissolved in 40 mls of water to yield a solution into which the fly ash was mixed. The mixture was then dried to yield a product.

EXAMPLE 9

| Formulation | |
|---|---|
| Fluorescein | 100 g |
| Microballoons of polyvinylidene chloride (Expancel) | 2 to 5 g |
| Sodium carboxy methyl cellulose (Diacel 1130 at a concentration of 2 g per 100 ml) | 100 ml |

EXAMPLE 10

| Formulation | |
|---|---|
| Fluorescein LT | 500 g |
| Sodium carboxy methyl cellulose glass microballoons sold under the name of ercospheres M37 lot No. 6704 particle size 62 to 100 micron | 8 g |
| Glycerol | 20 ml |

The carboxy methyl cellulose was pre-wet with 20 mls of ethanol and dissolved in 100 mls of water which was added drop wise whilst heating and stirring. More water was added as the ethanol evaporated to make a total of 200 mls.

EXAMPLE 12

| Formulation | |
|---|---|
| Fluorescein | 1000 g |
| Carboxyl Methyl Cellulose (DIACEL 1130) | 10 g |
| Glass Microballoons as for Example 10 | 16 g |
| Glycerine | 40 g |
| Fumed silica | 40 g |

The sodium carboxyl methyl cellulose was pre wet with ethanol and dissolved in 600 mls of water whilst stirring and heating. Water was added to the mixture to obtain a "thickshake" like consistency. The mixture was dried at 60° C. for 48 hours and then 100° C. for 24 hours. The formulation was deliberately made with a relative density less than that of water so that it would float to the surface from a point beneath the surface.

What is claimed is:

1. A marine dye composition comprising a mixture of (1) from about 90 to about 98 percent by weight a water-soluble or -dispersible dye, (2) microballoons having such a bulk density and being present in such an amount as to cause said composition to have a relative density of about 1 and to be capable of floating at the surface of a body of water, and (3) a water-soluble or -dispersible binding agent for binding the dye and microballoons together, which composition rapidly provides a patch of dissolved dye on the surface of the water for a period of up to 30 minutes.

2. The marine dye composition of claim 1, wherein said dye comprises fluorescein, CI acid Yellow 73 of the formula

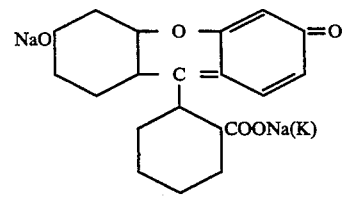

or a mixture of CI acids Red 50 of the formula,

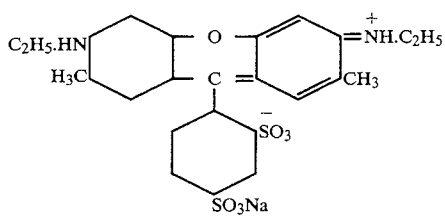

Red 51 of the formula

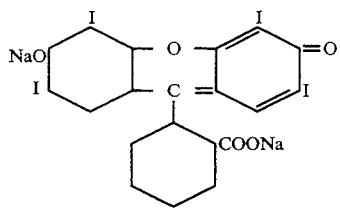

and Yellow 73; microballoons are formed of a polyvinylidene chloride, polyethylene or phenol-formaldehyde resin, and said binding agent is a sodium carboxyl methyl cellulose, polyvinyl alcohol or polyvinyl acetate.

3. The marine dye composition of claim 1, wherein said mixture further includes glycerol in an amount up to 5 percent by weight.

4. A marine dye composition comprising a mixture of (1) a water-soluble or -dispersible dye, (2) plastic or glass microballoons having such a bulk density and being present in such an amount as to cause said composition to have a relative density of about 1 and to be capable of floating at the surface of a body of water, and (3) a water-soluble or -dispersible binding agent for binding the dye and microballoons together, which composition rapidly provided a patch of dissolved dye on the surface of the water for a period of up to 30 minutes.

5. The marine dye composition of claim 4, wherein said dye comprises fluorescein, said microballoons are formed of a polyvinylidene chloride, polyethylene or phenol-formaldehyde resin, and said binding agent is a sodium carboxyl methyl cellulose, polyvinyl alcohol or polyvinyl acetate.

6. The marine dye composition of claim 4, wherein said dye is a mixture of CI acid Yellow 73 of the formula

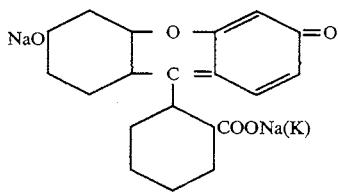

or CI acids Red 50 of the formula

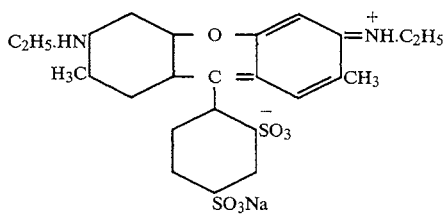

Red 51 of the formula

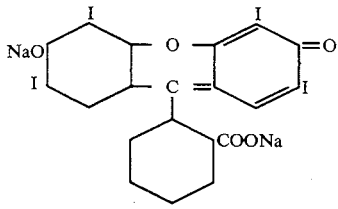

and Yellow 73.

7. The marine dye composition of claim 4, wherein said mixture further includes glycerol in an amount up to 5 percent by weight.

8. The marine dye composition of claim 5, wherein the bulk density of said microballoons is bout 0.01 gms per cc and said mixture comprises from about 1.5 to about 1.8 percent by weight of said microballoons, from about 0.8 to 1.3 percent by weight of said binding agent, and from about 90 to about 98 percent by weight of said dye.

9. The marine dye composition of claim 8, wherein said microballoons are formed of polyvinylidene chloride and said binding agent is a sodium carboxyl methyl cellulose.

* * * * *

UNITED STATES PATENT AND TRADEMARK OFFICE
CERTIFICATE OF CORRECTION

PATENT NO. : 5,405,416
DATED : April 11, 1995
INVENTOR(S) : Robert J. Swinton

It is certified that error appears in the above-indentified patent and that said Letters Patent is hereby corrected as shown below:

Claim 4, column 7, line 40, change "provided" to --provides--.

Claim 6, column 8, line 2, before "CI" delete "a mixture of";
line 14, before "CI" insert --a mixture of--.

Signed and Sealed this

First Day of August, 1995

Attest:

BRUCE LEHMAN

*Attesting Officer*　　*Commissioner of Patents and Trademarks*